(12) United States Patent
Khairy

(10) Patent No.: US 9,972,180 B2
(45) Date of Patent: May 15, 2018

(54) AUTONOMOUS AREA MONITORING DEVICE USING A MULTI-AREA PASSIVE INFRARED SENSOR

(71) Applicant: FREEBOX, Paris (FR)

(72) Inventor: Mehdi Khairy, Paris (FR)

(73) Assignee: FREEBOX, Paris (FR)

( * ) Notice: Subject to any disclaimer, the term of this patent is extended or adjusted under 35 U.S.C. 154(b) by 0 days. days.

(21) Appl. No.: 15/694,698

(22) Filed: Sep. 1, 2017

(65) Prior Publication Data
US 2018/0061198 A1    Mar. 1, 2018

(30) Foreign Application Priority Data

Sep. 1, 2016  (FR) ..................... 16 58140

(51) Int. Cl.
G08B 13/19   (2006.01)
G01J 5/10    (2006.01)
G01J 5/00    (2006.01)

(52) U.S. Cl.
CPC ............. G08B 13/19 (2013.01); G01J 5/10 (2013.01); G01J 2005/0077 (2013.01); G01J 2005/106 (2013.01)

(58) Field of Classification Search
CPC .... G08B 13/19; G01J 5/10; G01J 2005/0077; G01J 2005/106; G01S 13/723; G06C 30/02; G06C 30/0261; G06C 30/0269; H04W 4/028
See application file for complete search history.

(56) References Cited

U.S. PATENT DOCUMENTS

| | | | | |
|---|---|---|---|---|
| 5,101,194 A | | 3/1992 | Aucun | |
| 5,576,972 A | * | 11/1996 | Harrison | ................. G01S 13/04 |
| | | | | 702/128 |
| 7,463,950 B1 | * | 12/2008 | Brey | ................... H05K 7/20745 |
| | | | | 361/695 |
| 2005/0206520 A1 | * | 9/2005 | Decker | .............. G06K 19/0717 |
| | | | | 340/539.22 |
| 2008/0010225 A1 | * | 1/2008 | Gonsalves | ............. G06N 7/005 |
| | | | | 706/11 |

(Continued)

FOREIGN PATENT DOCUMENTS

JP   2011-102670   5/2011
WO   WO2011/005074   1/2011

*Primary Examiner* — Orlando Bousono
(74) *Attorney, Agent, or Firm* — Steven M. Greenberg, Esq.; CRGO Law

(57) ABSTRACT

A multi-area passive infrared sensor (PIF) produces a two-dimensional image formed of a grid of squares corresponding to adjacent elementary areas of an area to be monitored, with, for each square, a respective heat signal. The squares of the grid are classified into authorized and secured squares, and the device produces, for each square, an indicator of presence/absence of a target. In the presence of a detected target in at least one square, the processor conditionally delivers an alert as a function of i) the position on the grid of the detected target and ii) of the classification into authorized or secured square of the square in which this target is detected. A data memory stores a history of the states of the grid, and the processor performs a tracking of the target by an algorithm based on adjacent squares, based on this history.

5 Claims, 4 Drawing Sheets

(56) References Cited

U.S. PATENT DOCUMENTS

| | | | |
|---|---|---|---|
| 2008/0300725 A1* | 12/2008 | Brey | H05K 7/20745 700/278 |
| 2008/0300818 A1* | 12/2008 | Brey | H05K 7/20745 702/130 |
| 2009/0015460 A1* | 1/2009 | Fox | G01S 7/2922 342/53 |
| 2009/0018875 A1* | 1/2009 | Monatesti | G06Q 10/06 705/7.26 |
| 2009/0201190 A1* | 8/2009 | Huthoefer | G01S 7/003 342/27 |
| 2010/0134285 A1* | 6/2010 | Holmquist | G08B 13/2494 340/541 |
| 2010/0283662 A1* | 11/2010 | Fox | G01S 7/2922 342/53 |
| 2010/0309310 A1* | 12/2010 | Albright | G08G 5/0082 348/135 |
| 2011/0001657 A1* | 1/2011 | Fox | G01S 7/2922 342/107 |
| 2011/0158482 A1* | 6/2011 | Johnson | G06K 9/00771 382/107 |
| 2011/0264608 A1* | 10/2011 | Gonsalves | G06N 7/005 706/10 |
| 2011/0267221 A1* | 11/2011 | Brundick | G01S 13/878 342/180 |
| 2012/0008819 A1* | 1/2012 | Ding | G06K 9/00335 382/100 |
| 2012/0093370 A1* | 4/2012 | Ding | G06K 9/00771 382/106 |
| 2012/0096549 A1* | 4/2012 | Amini | H04L 63/1433 726/23 |
| 2012/0151553 A1* | 6/2012 | Burgess | G06F 21/00 726/1 |
| 2012/0167164 A1* | 6/2012 | Burgess | G06F 21/00 726/1 |
| 2013/0059607 A1* | 3/2013 | Herz | H04L 67/20 455/456.3 |
| 2013/0133026 A1* | 5/2013 | Burgess | G06F 21/62 726/1 |
| 2013/0173062 A1* | 7/2013 | Koenig-Richardson | G06Q 10/00 700/275 |
| 2013/0266227 A1* | 10/2013 | Ding | G06K 9/00335 382/197 |
| 2014/0062757 A1* | 3/2014 | Fox | G01S 7/2922 342/52 |
| 2014/0095417 A1* | 4/2014 | Herz | G06F 19/3493 706/12 |
| 2014/0247994 A1* | 9/2014 | Ding | G06K 9/00335 382/197 |
| 2014/0308978 A1* | 10/2014 | Herz | H04L 67/20 455/456.3 |
| 2015/0187191 A1 | 7/2015 | Guerzoni | |
| 2015/0199699 A1* | 7/2015 | Milton | G06Q 30/02 705/7.34 |
| 2015/0220850 A1* | 8/2015 | Husain | G06N 5/003 706/12 |
| 2015/0260838 A1* | 9/2015 | Brundick | G01S 13/878 382/103 |
| 2016/0027278 A1* | 1/2016 | McIntosh | G08B 21/0423 715/741 |
| 2016/0033334 A1 | 2/2016 | Zhevelev | |
| 2016/0097839 A1* | 4/2016 | Fox | G01S 7/2922 342/52 |
| 2016/0132728 A1* | 5/2016 | Choi | G06K 9/6215 382/103 |
| 2016/0203211 A1* | 7/2016 | Milton | G06F 17/30241 705/14.58 |
| 2016/0247175 A1* | 8/2016 | Milton | G06Q 30/0205 |
| 2016/0300477 A1* | 10/2016 | Pickford | G08B 25/10 |
| 2017/0048672 A1* | 2/2017 | Herz | H04L 67/20 |
| 2017/0253330 A1* | 9/2017 | Saigh | B64C 39/024 |
| 2017/0259753 A1* | 9/2017 | Meyhofer | B60R 11/04 |

\* cited by examiner

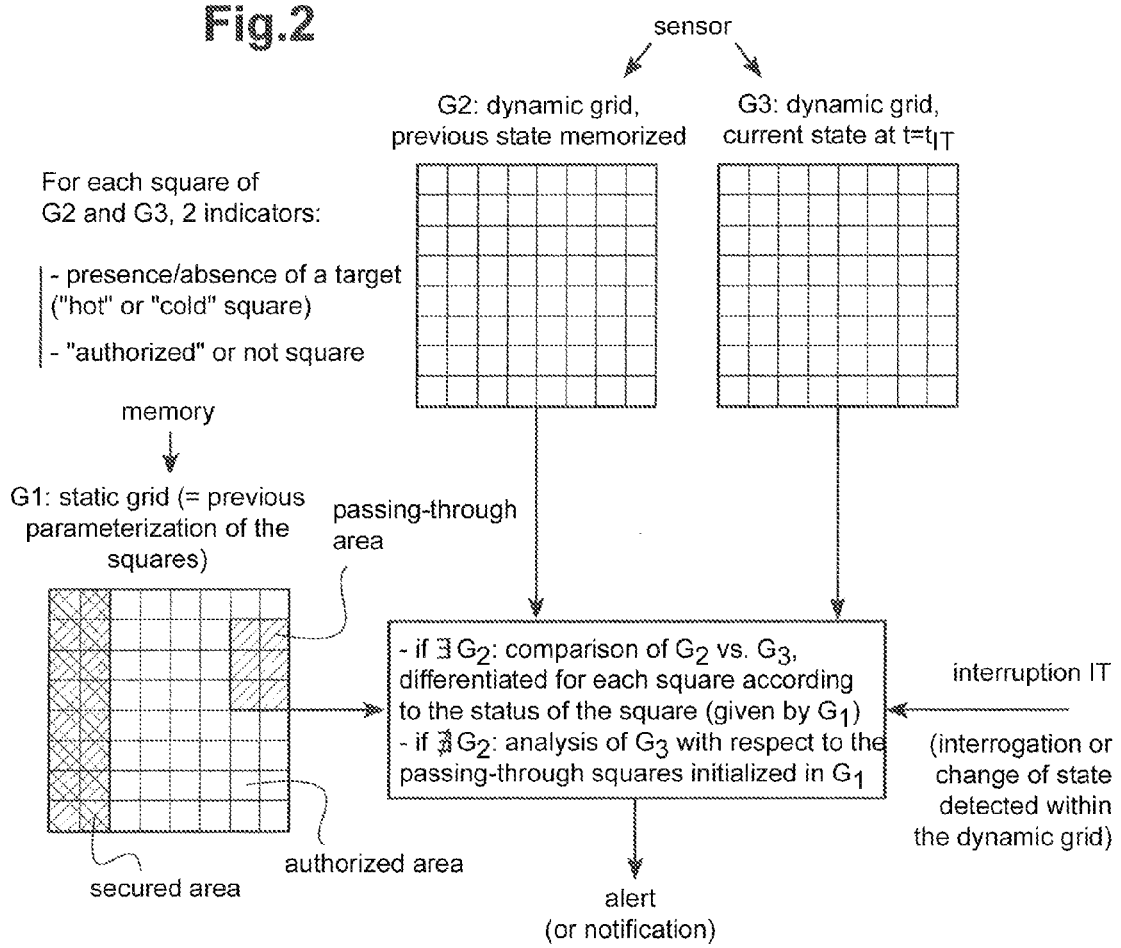
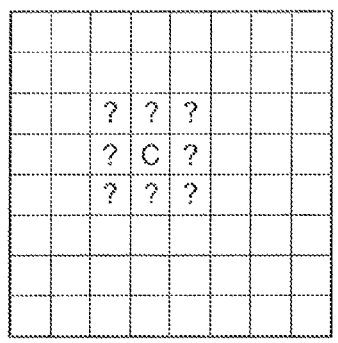

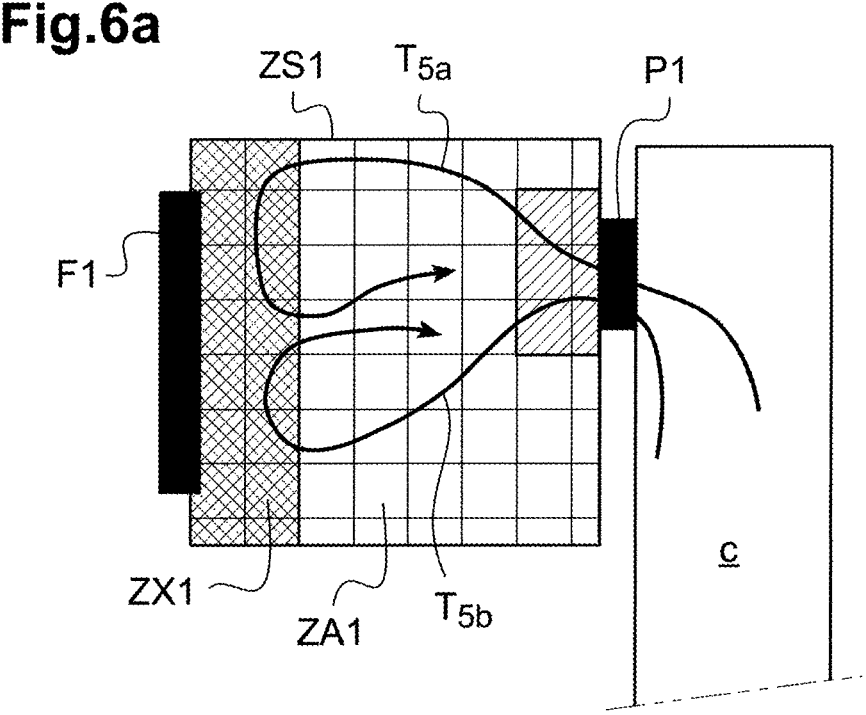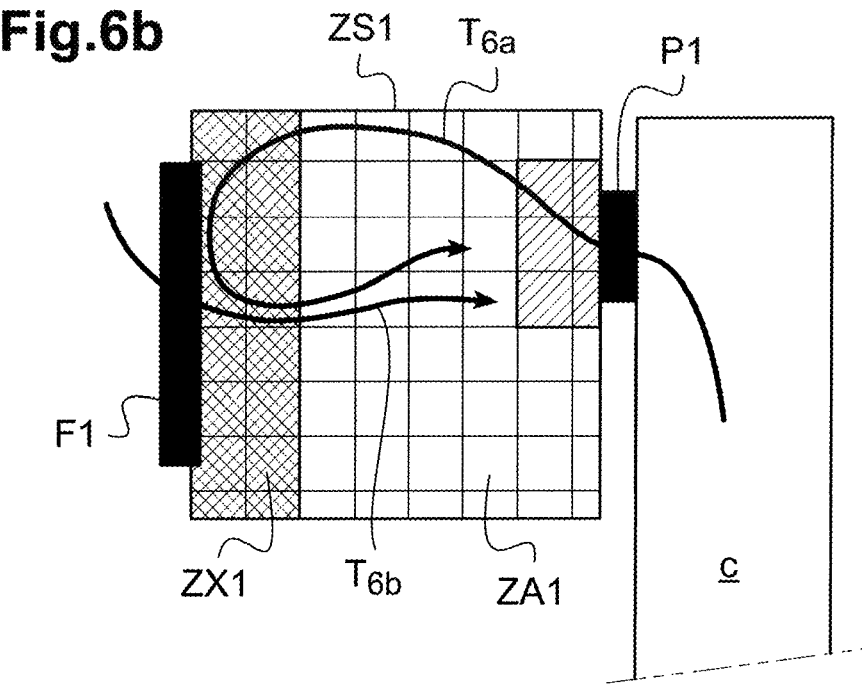

AUTONOMOUS AREA MONITORING DEVICE USING A MULTI-AREA PASSIVE INFRARED SENSOR

CROSS REFERENCE TO RELATED APPLICATIONS

This application claims priority under 35 U.S.C. § 119(a) to French Patent Application Serial Number 1658140, filed Sep. 1, 2016, the entire teachings of which are incorporated herein by reference.

BACKGROUND OF THE INVENTION

Field of the Invention

The invention relates to an autonomous area monitoring device implementing a sensor of the passive infrared (PIR) type, which measures the IR light radiation produced by "hot objects" defined as sources of heat interpreted as being individuals in displacement located in its field of view.

Description of the Related Art

PIR sensors are currently used as presence sensors, an increase of the detected radiation being interpreted as being consecutive to the appearance of a person in the field of view of the sensor, which allows controlling the ignition of a lighting, delivering an intrusion alert signal.

The sensor's field of view can be widened by optical means by associating with the sensor a Fresnel lens or a reflector, but in any case the covered area is monitored in an overall and undifferentiated manner.

On the scale of a premises including several rooms (house or apartment, offices, museums, showrooms, etc.), the intrusion detection systems may implement a technique of tracking (follow-up) of hot objects on the scale of the premises. For that purpose, it is advisable to equip each room of the premises with a PIR detector and/or to provide the potential accesses to the outside (doors, windows) with perimeter sensors connected to an alarm unit. Based on this information, the system analyses the displacements of the objects detected by the PIR sensors to extrapolate a displacement from one room to another one, and to discriminate between displacements within the premises (those of an authorized occupant or an attendant passing from one room to another one) and displacements of unknown origin, that may lead to a suspicion of intrusion.

In the field of security, PIR sensors may be used in applications of shape recognition using the thermographic image (silhouette of an individual) formed on the sensitive surface of the sensor, for example as shown in United States Patent Application Publication No. 2012/0038778 and U.S. Pat. No. 5,283,551, which describe the performance of two-dimensional and one-dimensional scanning, respectively, of the thermographic image produced by the sensor. The shape recognition algorithm allows discriminating the nature of the hot object that comes to be detected as a function of the silhouette thereof, but has not for object to track the displacements of this object.

The Japanese Laid Open Publication NO. 2011-102670 discloses a device of this type, wherein the multi-area PIR sensor produces a 2D image formed of a grid of elementary squares and wherein a processor analyses this image to determine the presence or the absence of a source of heat in each square of the grid, in order to emit, as the case may be, an alarm. As well, U.S. Pat. No. 5,101,194 describes a device operating according to a similar principle. Finally, United States Patent Application Publication No. 2015/0347910 describes a housing equipped with a multitude of detectors distributed over the space to be monitored, in order to finely analyse the displacements of the persons present in the housing.

This technique, in addition to the necessity to place PIR detectors and/or perimeter sensors in all the rooms liable to be passed through by a legitimate occupant of the place, has several limitations.

Firstly, the PIR sensors must be placed so that the system can make sure that the hot objects do not pass in an "area of shade" during the passage from one room to another one. It may be an area that is in the field of view of none of the PIR detectors, or a corridor or a hall having no PIR detector. If the person passes through the area of shade, it is impossible to know if the "hot object" detected in a room has appeared in this room coming from the outside (intrusion through a window), or if it moves internally, from an authorized area of the premises.

This drawback may be compensated for by no longer using a simple PIR detector but an IR video camera coupled to an image processor programmed to make on this image a target follow-up (video tracking). But this technique involves a far higher cost than that of a simple PIR detector, with always the necessity to connect the camera to an alarm unit ensuring the grouping together of the different pieces of information and the analysis thereof.

Another drawback of conventional PIR detectors is that they can be deluded by hot sources that are fixed but that intermittently emit a variable radiation, for example thermostat electric heaters: the triggering of the heater causes a fast increase in temperature of the latter, detectable by the PR sensor, which won't be able to discriminate between the entry of a mobile hot object into its field of view and the rising in temperature of a fixed cold object already present in this field of view.

BRIEF SUMMARY OF THE INVENTION

The present invention aims to solve all these difficulties, by proposing an autonomous area monitoring device implementing a passive infrared sensor adapted to perform a tracking of hot objects (sources of heat detected by the sensor) on the scale of a room, in a fully autonomous manner.

The basic idea of the invention resides in the use of a PR sensor of the multi-area PIR type, producing a two-dimensional image formed of a matrix (grid) of squares corresponding to adjacent elementary areas of the area to be monitored, with for each square a respective signal of presence/absence of a source of heat at a given instant.

It will hence be possible to accurately track a source of heat detected in the area to be monitored, on a grid representative of the topography of the area to be monitored.

The accurate tracking, according to the invention, of the hot object within the room will allow in particular determining where the appeared object comes from, and discriminating between authorized origin (for example, inner door) and suspicious origin (for example, window).

The object of the invention is to propose such a device with the following advantages:
  reduced cost of installation, far lower than an infrared camera coupled to a system of target tracking on a video image;
  absence of perimeter detectors, become useless;
  single device for a given room; and possibility to place a device only in the rooms having an access to the outside (door or window), the rooms with no outer access such as hall or corridor having no need to be provided with a detector;

possibility of full autonomy, with no link of the detector with an alarm unit or, if an alarm unit is used, possibility of triggering an alert even in case of disconnection of the unit;

possibility of leaving the device in service even in the presence of legitimate occupants circulating in the premises, which allows for example leaving the alarm ON during the night, insofar as the displacements within the premises will be detected as such and won't be considered as suspicious;

immunity to the fixed sources of variable heat such as the thermostat heaters: these sources, being fixed, won't be associated with any displacement and will be able to be ignored in the monitoring of the area.

As regards the multi-area PIR sensor itself, it is a sensor, for example an infrared array sensor similar to that described in U.S. Pat. No. 7,728,297 to Kimata Masafumi for INFRARED ARRAY SENSOR that describes an electronic component usable to make such a sensor.

The sensors of this type are presently used for a smart control of automatic doors, for the control and the adjustment of air conditioning facilities, etc.

The present invention proposes an autonomous area monitoring device that includes:

a passive infrared sensor, adapted to be mounted at a predetermined point from which the area to be monitored can be viewed, this sensor delivering a sequence of signals of detected heat within the area to be monitored, with the sensor being a sensor of the multi-area type producing a two-dimensional image formed of a grid of squares corresponding to adjacent elementary areas of the area to be monitored, with, for each square, a respective heat signal;

means for analysing the heat signals of each square of the grid and for delivering, for each signal of the sequence and for each square of the grid, an indicator of presence of a source of heat representative of a target detected in the corresponding square; and a data processor, adapted to analyse the signals delivered by the sensor to discriminate between presence and absence of a source of heat within the area to be monitored as a function of predetermined criteria, and, in the presence of a target detected in at least one square of the grid, to conditionally deliver as an output an alert.

Particular characteristics of the invention include:

the squares of the grid are classified into authorized squares and secured squares; and the data processor is configured to conditionally deliver said alert in the presence of a target detected in at least one square of the grid as a function of i) the position on the grid of the detected target and ii) of the classification into authorized square or secured square of the square in which this target is detected.

In a preferential embodiment, the device includes a data memory interfaced with the processor, adapted to store a history of the successive states of the indicators of presence of a source of heat on the grid, and the data processor is further configured to perform:

a tracking of the detected target, by implementation of an algorithm based on adjacent squares, with determination of the route of the tracked target, on the grid, based on said history of the successive states of the indicators of presence of a source of heat on the grid; and the conditional delivery of said alert as a function i) of said route of the tracked target and ii) of the classification into authorized squares or secured squares of the squares successively occupied by the target along this route.

According to various advantageous subsidiary characteristics of this preferential embodiment:

the data processor is configured to conditionally deliver said alert by, in case of a target appearing in a secured square, analysing the neighborhood of this square to determine whether, in the previous state of the grid stored in the memory, said target had been detected in a secured neighbour square with, in this case, delivery of the alert, or in an authorized neighbour square with, in this case, absence of delivery of an alert;

the squares of the grid are classified into authorized squares, secured squares and passing-through squares, and in case of absence of a previous state stored in the memory, the data processor is configured to conditionally deliver said alert by delivery of the alert if the target is detected in a secured square, or absence of alert delivery if the target is detected in a passing-through square;

in case of a plurality of targets detected, the data processor is configured to conditionally deliver said alert by, for each of the successive states of the indicators of presence of a source of heat on the grid, counting the number of detected targets simultaneously present in the area to be monitored and, in the case of target(s) appearing in a secured square then moving to an authorized square at a transition between said successive states, delivery of said alert in case of change of the number of targets counted before and after said transition.

BRIEF DESCRIPTION OF THE SEVERAL VIEWS OF THE DRAWINGS

An exemplary embodiment of the present invention will now be described, with reference to the appending drawings in which the same references denote throughout the figures identical or functionally similar elements.

FIGS. 2 and 3 serve to illustrate the implementation of the algorithm based on adjacent squares, with superimposition of dynamic grids, produced by the sensor and changing over the detections of targets and the displacement of these targets, and a static grid kept in memory, previously parameterized according to the nature of the areas to be protected or not of the area to be monitored.

FIGS. 6a and 6b illustrate an improvement of the technique of the invention, allowing the detection of an anomaly in the number of persons moving simultaneously within the limits of the area to be monitored.

DETAILED DESCRIPTION OF THE INVENTION

Figure 1:
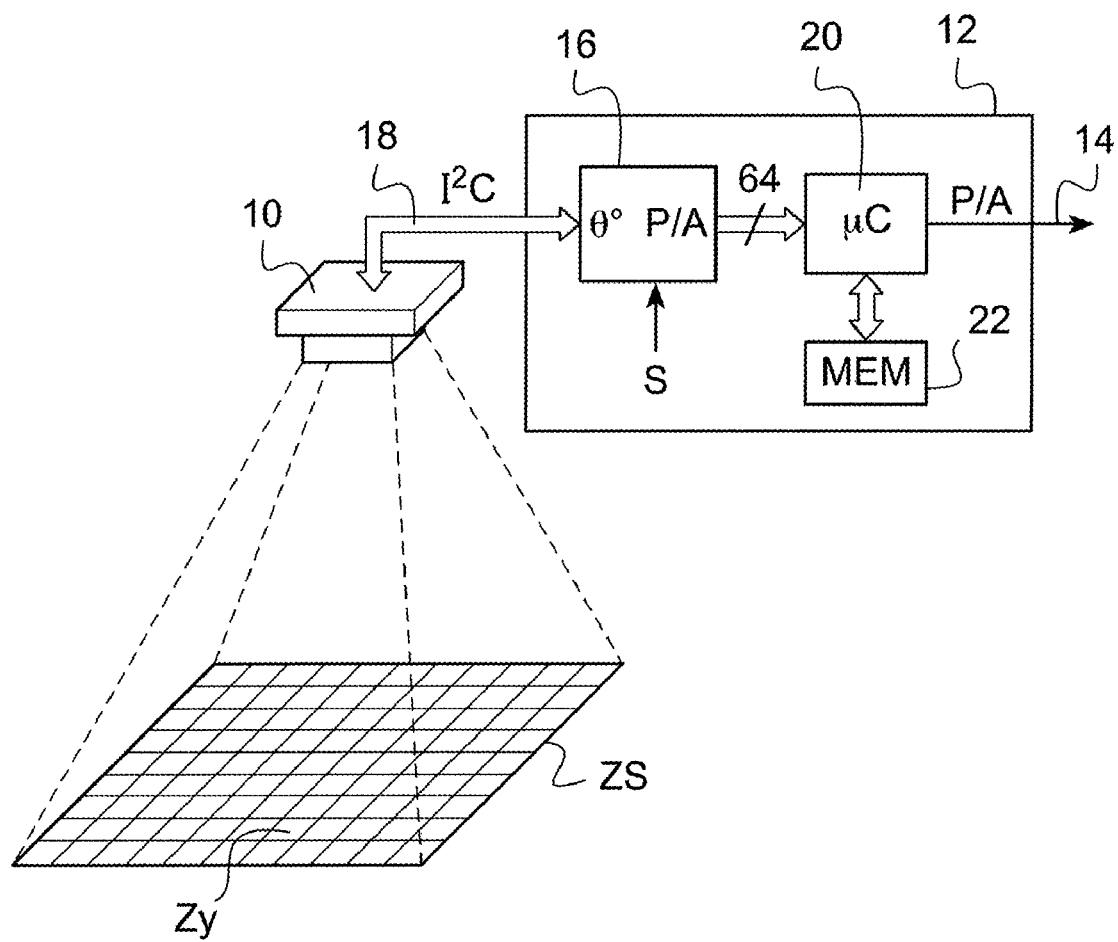
FIG. 1 is a schematic representation of the monitoring device of the invention, with the multi-area PIR sensor whose field of view covers the area to be monitored.

In FIG. 1, the reference 10 denotes an infrared sensor of the multi-area type that is, as explained hereinabove in introduction, a sensor of the passive infrared (PIR) type comprising an optical system projecting on a 2D sensor an image of the area to be monitored ZS.

The so-formed 2D image is in the form of a matrix (grid) of i×j elementary sensor areas, each corresponding to an elementary area Zij of the area to be monitored ZS. The sensor delivers for each elementary sensor area a corresponding temperature signal, hence allowing detecting the presence of a source of heat specifically in each of the areas Zij of the area to be monitored ZS.

Such a multi-area PIR sensor is known per se, for example from the above-mentioned U.S. Pat. No. 7,728,297 B2, and won't be described in more detail herein. For the implementation of the invention, a suitable component is for example the Panasonic Infrared Array Sensor Grid-EYE (AMG88), which is a multi-area sensor with a grid of 8×8=64 elementary areas, each corresponding to an angle of view of about 5.6° in both directions. This component delivers for each elementary area a digital temperature signal of the corresponding elementary area Zij with a refresh rate of once per second. The whole is in the form of a compact casing, that may be for example placed in the middle of the room, at the ceiling.

The reference 12 denotes a circuit for processing and analysing the data delivered by the sensor 10. This circuit may be arranged in a single-piece casing also integrating the sensor 10, or placed remote from the latter.

The circuit 12 delivers as an output an alert signal 14, which is a signal of presence/absence (P/A) of a non-authorized target, wholly in the area to be monitored ZS, i.e. a unique alert signal for the whole area.

To elaborate this alert signal 14, the circuit 12 receives the 8×8=64 heat signals, which are applied to a comparator stage 16 coupled to the multi-area sensor 10, for example a bus I²C 18. Each heat signal, representative of a temperature in an elementary area Zij, is compared to a threshold S to give an individual signal of presence/absence of a target in each of these respective elementary areas Zij.

We hence have at the output of the state 16 a set of data, which may be represented as a matrix of i×j squares Cij, each of these squares being associated with an individual signal of presence/absence of a target in the corresponding elementary area Zij. This indicator is a binary indicator indicating the presence or not of a source of heat, according to whether the temperature signal in the area Zij is above or below the threshold S, respectively.

The matrix of data delivered by the stage 16 is analysed by a micro-controller 20, and the successive states of the matrix, at least the state preceding the current iteration, are stored in a data memory 22 so as to have a history reflecting the possible displacements, from one iteration to the following one, of the source of heat from one square to another one of the area to be monitored.

We will now expose, with reference to FIGS. 2 and 3, the implementation of the detection algorithm based on adjacent squares according to the invention. This detection algorithm is based on the analysis of three grids corresponding to the different areas of the sensor, with:

a static grid G1, parameterized once and for all by the user as a function of the configuration of the place. This static grid G1 is kept as such in the memory, and once parameterized it is no longer modified;

two dynamic grids G2 and G3, modified at each iteration of the algorithm. The grid G3 contains the state of the grid at a given instant t=$t_{IT}$, whereas the grid G2 comprises the previous state of this same grid, memorized at the previous iteration—i.e. at each new iteration, the old grid G3 becomes the new grid G2, and so on.

In the following description that will be given, only two dynamic grids G2 and G3 are used. It is however possible to keep in memory a greater number of dynamic grids, for example the grid corresponding to the state of the last but one iteration, of the antepenultimate iteration, etc., so as not only to know the previous state, but also to have a full history of the evolution of the dynamic grid over a longer period.

The dynamic grids G2 and G3 comprise, for each of the i×j squares, two indicators:

presence/absence of a target, i.e. an indicator specifying if the corresponding square is a "hot" or "cold" square (a "hot" square being a square in which is detected a source of heat whose measured temperature is higher than the predetermined threshold S); and an indicator specifying if the square is an "authorized" square or not, this indicator being modifiable by the analysis algorithm that will be described hereinafter.

The static grid G1 corresponds to a previous parameterizing function of the particular topography of the area to be monitored ZS.

Each of the squares is essentially classified according to two types of areas:

"secured area" ZXi, corresponding to an area in which a risk of intrusion exists and that must hence be under permanent monitoring: typically the area of a room located near a window or a door, with an access to the outside; and "authorized area" ZAi, for the squares that are not in a secured area: it is an area in which the presence of a source of heat is a priori not suspected if no intrusion have previously been detected, for example the area in the middle of a room, area with no window nor access to the outside, in which the authorized user will be able to move freely without triggering an alarm.

For taking into account the particular case of the first iteration, i.e. in which no dynamic grid G2 yet exists, a third type of area is provided in the classification of the squares, i.e.:

"passing-through area" ZTi, which is an area located within the "authorized area" for which an access from the outside necessary come from an authorized user: it is typically an area around an inner door opening on a corridor, a hall, etc., with no access to the outside.

This sub-classification of the authorized area squares into passing-through area squares allows, as explained hereinafter, initializing in the absence of a known history the validity of the status of the dynamic grid.

The implementation of the algorithm based on adjacent squares of the dynamic grid delivered by the multi-area PIR sensor, allowing determining a potential intrusion in the area to be monitored ZS, will now be exposed.

This algorithm is executed iteratively, and triggered by an interruption IT, which may be either a polling interruption generated at regular intervals, or an interruption triggered upon a change of state detected within the dynamic grid, i.e. when it is detected that the state of a dynamic grid delivered by the sensor at the refresh rate is different from the previous state of this same dynamic grid.

When an interruption IT is activated, the algorithm compares the grids G2 (previous state memorized) and G3 (current state) and searches, for each square, the indicator of presence/absence of a target had been modified. For the squares whose indicator has switched from "absence" to "presence", i.e. the squares that have switched to "hot square" from the last state, the algorithm examines, as a function of the parameterization of the static grid G1, if the square in question is in a secured area, of in an authorized or passing-through area. If this square is in an authorized or passing-through area, then the corresponding indicator in the grid G3 is positioned to "authorized square".

On the other hand, if the square in question is in a secured area (cf. illustration of FIG. 3), it is advisable to determine if, in this grid G2, one of the adjacent squares was an "authorized square", i.e., in other words, if the source of heat detected in G3 in a secured area actually came from an "authorized square". In this case, the indicator of the square is positioned to "authorized square".

In the case where the algorithm finds no authorized adjacent square in G2, then this square is a priori suspicious.

To discriminate the particular case of a source of heat coming for example from the triggering of a thermostat heater R (which is hence not a mobile source), the same algorithm of management by adjacent squares is applied so as to detect whether, during the following iteration, there had been a movement or not from the square in which the source of heat had been detected to one of the adjacent squares. In the affirmative, the alarm can be triggered; in the negative, it is a still source of heat, that does not reveal an intrusion.

The final step consists in merging the two grids G2 and G3 by keeping the "hot" squares of the grid G3 and by positioning as "cold squares" the squares of the grid G3 that were previously "hot" squares, and that have become "cold".

The implementation of the above-mentioned algorithm presupposes the knowledge of a previous state, to detect whether there had been a movement or not of a hot source from an adjacent square between two successive iterations.

If the previous state (grid G2) is not available, as this is the case at the powering-up of the system or for any other reason, the algorithm analyses the dynamic grid G3 delivered by the sensor and initializes as an "authorized square" each square in which a hot source has been detected, if this square is located inside the "passing-through area", i.e. if the hot source corresponds to the presence of a target of which it is certain that it is an authorized user (because it comes for example from an inner communication door of the premises, and is hence not an intruder).

Figure 4:
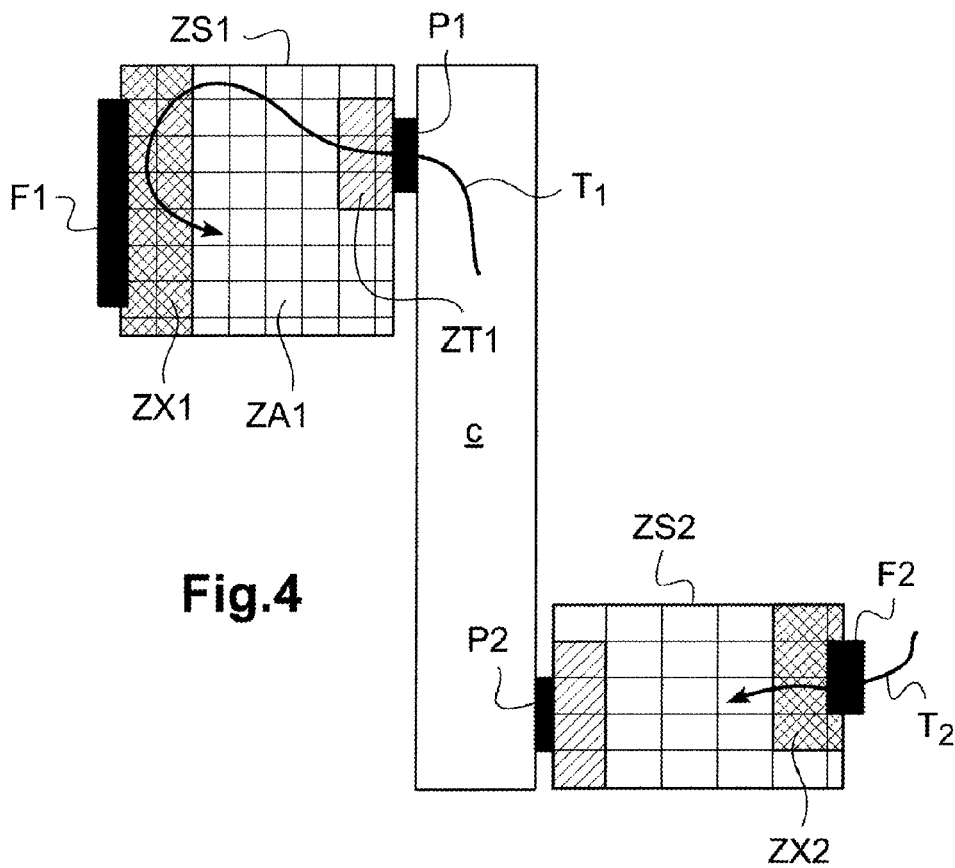
FIGS. 4 and 5 illustrate examples of implementation of the monitoring device of the invention, according to various scenarios of route of a user or an intruder in the area to be monitored.
Figure 5:
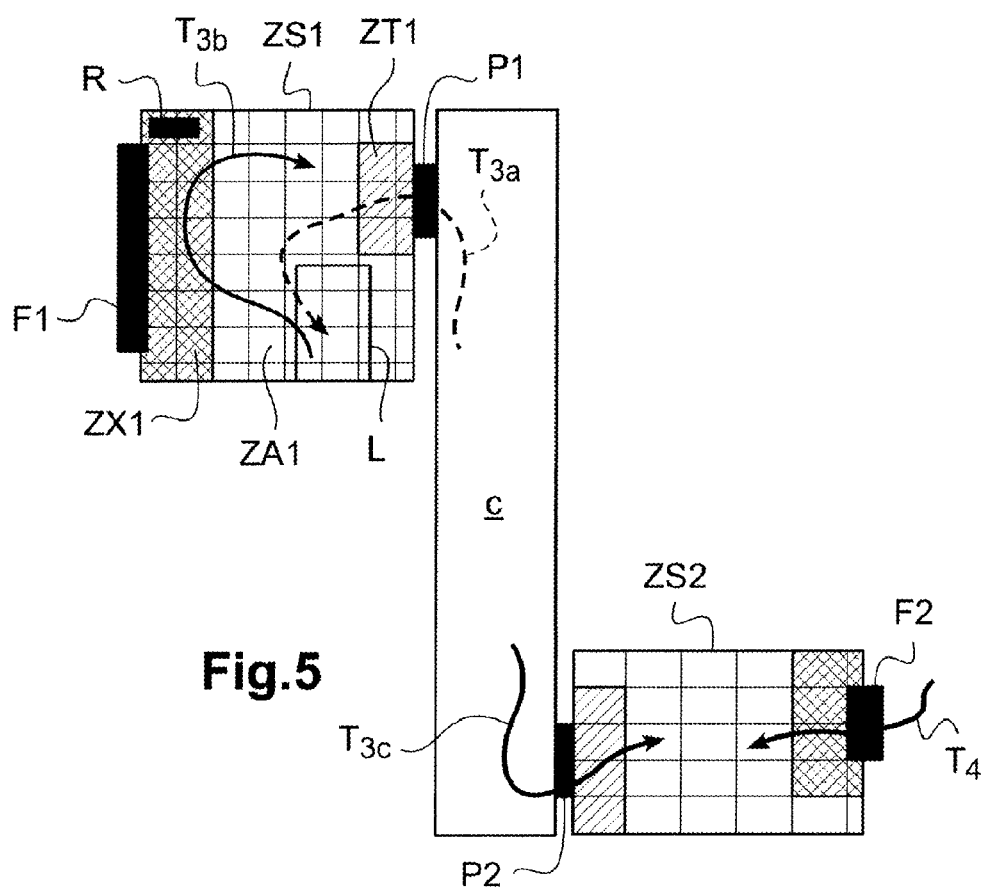

FIGS. 4 and 5 illustrate the results obtained by the implementation of the monitoring device of the invention, according to various scenarios of route of a user or an intruder in the area to be monitored.

In these figures is represented a premises (housing, commercial premises, museum, etc.) comprising two areas to be monitored ZS1 and ZS2, each provided with an autonomous monitoring device according to the invention, as described with reference to FIG. 1.

These two areas to be monitored ZS1 and ZS2 open to a corridor C, through respective inner doors P1 and P2. The areas to be monitored ZS1 and ZS2 moreover include respective windows F1 and F2 opening to the outside.

De facto, the detection of an entry into the area ZS1 or ZS2 through the window F1 or F2 is due to an intruder and must hence trigger an alarm, whereas an entry via the inner doors P1 and P2 can only be due to a normal user, and must not trigger an alarm.

The first scenario, corresponding to the route T1 of FIG. 4, is that in which the sensor detects the appearance of a source of heat appearing in the area ZT1 located close to the inner door P1, area which is a passing-through area, hence an authorized area. The detected source will be allocated in the dynamic grid with an "authorized square" indicator, that will be kept during all the displacements from square to square in the room ZS1, even if the source of heat passes in the secured area ZS1, because the "authorized square" indicator won't have been reset over the displacements along the route T1.

The second scenario is that corresponding to the route T2 of FIG. 4: in this case, the sensor detects a mobile source of heat coming from a secured area ZX2, and with no history of "authorized square" (previous state of the dynamic grid G2). It is hence a forbidden route, revealing an intrusion, and the alarm must be triggered.

The third scenario, illustrated by the routes T3a and T3b in FIG. 5, corresponds to an occupant, that lays down on a bed L and is asleep. At his wake-up, the sensor detects a displacement of a hot source, but this must not trigger an intrusion alarm. As a route history exists (initial route T3a of entry into the room and displacement up to the bed), the square indicators are initialized to "authorized square" and kept as such up to the wake-up. After the wake-up, the route T3b will include displacements that will come from a square with an "authorized square" indicator, which won't trigger an alarm, even if the person moves by passing through the secured area ZX1.

FIG. 5 also illustrates the case of a heater R operating intermittently, located in the secured area ZX1. The variations of temperature of this heater will regularly produce detections of a source of heat in this secured area ZX1, but in the absence of displacement of the detected source of heat, no intrusion alarm will be produced (the device may possibly deliver a notification signal corresponding to this situation, but without alarm triggering).

The fourth scenario, illustrated in FIG. 5 by the routes T3c and T4, illustrates the possibility to leave the monitoring device activated, even in the presence of occupants. Hence, if the appearance of a source of heat is detected in the secured areas ZX2, but can be linked to an authorized history (corresponding for example to the route T3c of an occupant coming from the corridor C), no alarm will be triggered. On the other hand, it will be possible to detect in the same time a mobile source heat in this same area, coming from the outside without authorization (route T4), leading to the triggering of an intrusion alarm. This case (mobile source with/without authorized history) is useful in particular for the monitoring of children rooms, or for animals moving in a house.

It will be noted that the detection of intrusion, in this scenario as in the other ones, does not require in any way the installation of perimeter detectors at the inner doors P1 and P2, these perimeter detectors being replaced by the memorizing of a history of the successive states of the dynamic grid delivered by the sensor.

FIGS. 6a and 6b illustrate an improvement of the technique that has just been exposed, for the detection of an anomaly in the number of persons moving simultaneously within the limits of the area to be monitored.

The history of the successive states of the dynamic grid delivered by the sensor allows, over a long-enough duration, keeping a trace of all the sources of heat detected and of the displacements thereof, which allows extrapolating the number of sources (i.e. of persons) simultaneously present in the area to be monitored.

In the case illustrated in FIG. 6a, two persons have entered successively the area to be monitored ZS1, along the routes T5a and T5b. Even if they pass through the secured area ZX1, before and after the passage through this area, the device will determine that there is still two persons present in the room.

On the other hand, in the case illustrated in FIG. 6b, a single person has entered the room (route T6a), then passes through the secured area ZX1. The device then determines, after this passage, the presence of two persons, and no longer only one, in the authorized area ZA1. This situation is considered as abnormal, and an alarm or a notification is then produced. This situation corresponds for example to that of a premises monitored by an attendant (hence an authorized person) that passes close to the window F1 to make a stooge enter. At the exit of the secured area ZX1, the two individuals will be in the authorized area ZA1, which should normally not produce the triggering of an alarm. But as the history of the successive states of the dynamic grid reveals, by counting, that previously there had only one person in the room, whereas now there are both of them, the situation can be revealed and signalled by the alarm.

What is claimed is:

1. An autonomous area monitoring device, comprising:
a passive infrared sensor, adapted to be mounted at a predetermined point from which the area to be monitored can be viewed, the passive infrared sensor delivering a sequence of signals of detected heat within the area to be monitored,
the passive infrared sensor being of the multi-area type producing a two-dimensional image formed of a grid of squares corresponding to adjacent elementary areas of the area to be monitored, with, for each square, a respective heat signal;
means for analysing the heat signals of each square of the grid and for delivering, for each signal of the sequence and for each square of the grid, an indicator of presence of a source of heat representative of a target detected in the corresponding square; and
a data processor, adapted to analyse the signals delivered by the sensor to discriminate between presence and absence of a source of heat within the area to be monitored as a function of predetermined criteria, and, in the presence of a target detected in at least one square of the grid, to conditionally deliver as an output an alert,
wherein the squares of the grid are classified into authorized squares and secured squares and wherein the data processor is configured to conditionally deliver said alert in the presence of a target detected in at least one square of the grid as a function of
i) the position on the grid of the detected target and
ii) of the classification into authorized square or secured square of the square in which this target is detected.

2. The autonomous device of claim 1, wherein:
the device comprises a data memory interfaced with the processor, adapted to store a history of the successive states of the indicators of presence of a source of heat on the grid; and
the data processor is further configured to perform:
a tracking of the detected target, by implementation of an algorithm based on adjacent squares, with determination of the route of the tracked target, on the grid, based on said history of the successive states of the indicators of presence of a source of heat on the grid; and
the conditional delivery of said alert as a function
i) of said route of the tracked target and
ii) of the classification into authorized squares or secured squares of the squares successively occupied by the target on this route.

3. The autonomous device of claim 2, wherein the data processor is configured to conditionally deliver said alert by:
in case of a target appearing in a secured square, analysing the neighborhood of this square to determine whether, in the previous state of the grid stored in the memory, said target had been detected:
in a secured neighbour square with, in this case, delivery of the alert, or
in an authorized neighbour square with, in this case, absence of delivery of an alert.

4. The autonomous device of claim 2, wherein:
the squares of the grid are classified into authorized squares, secured squares and passing-through squares; and
in case of absence of a previous state stored in the memory, the data processor is configured to conditionally deliver said alert by:
delivery of the alert if the target is detected in a secured square, or
absence of alert delivery if the target is detected in a passing-through square.

5. The autonomous device of claim 2, wherein, in case of a plurality of targets detected, the data processor is configured to conditionally deliver said alert by:
for each of the successive states of the indicators of presence of a source of heat on the grid, counting the number of detected targets simultaneously present in the area to be monitored; and
in the case of target(s) appearing in a secured square then moving to an authorized square at a transition between said successive states, delivery of said alert in case of change of the number of targets counted before and after said transition.

* * * * *